No. 711,963. Patented Oct. 28, 1902.
P. J. HART.
TOBACCO STEMMING AND BOOKING MACHINE.
(Application filed June 14, 1902.)
(No Model.) 3 Sheets—Sheet 1.
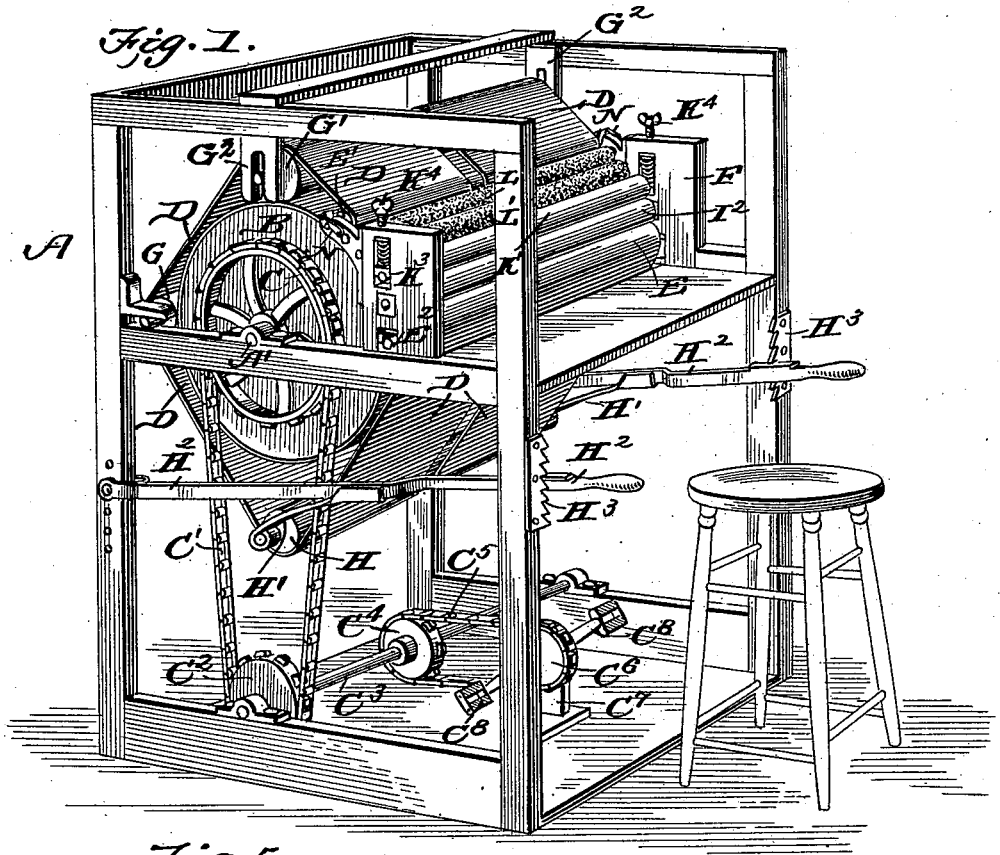
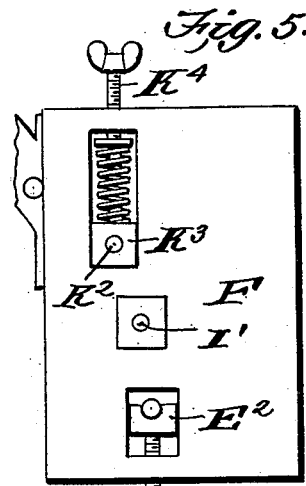
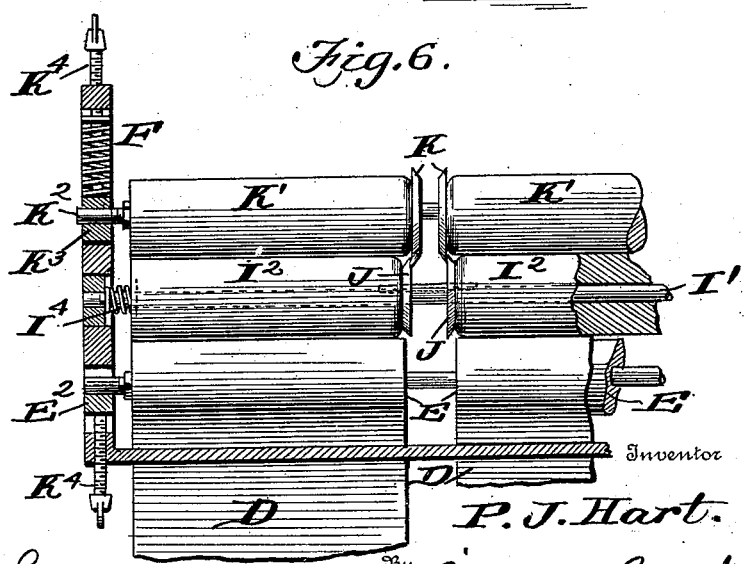
Witnesses
Inventor
P. J. Hart.
By
Attorneys No. 711,963. Patented Oct. 28, 1902.
P. J. HART.
TOBACCO STEMMING AND BOOKING MACHINE.
(Application filed June 14, 1902.)
(No Model.) 3 Sheets—Sheet 2.
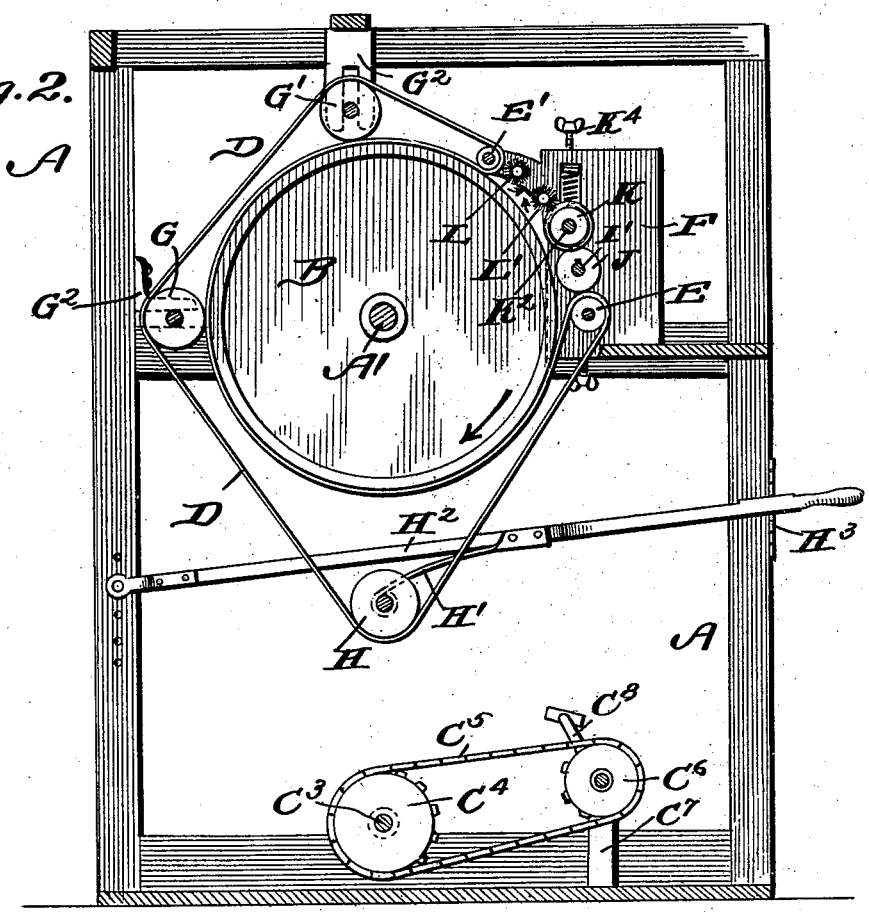
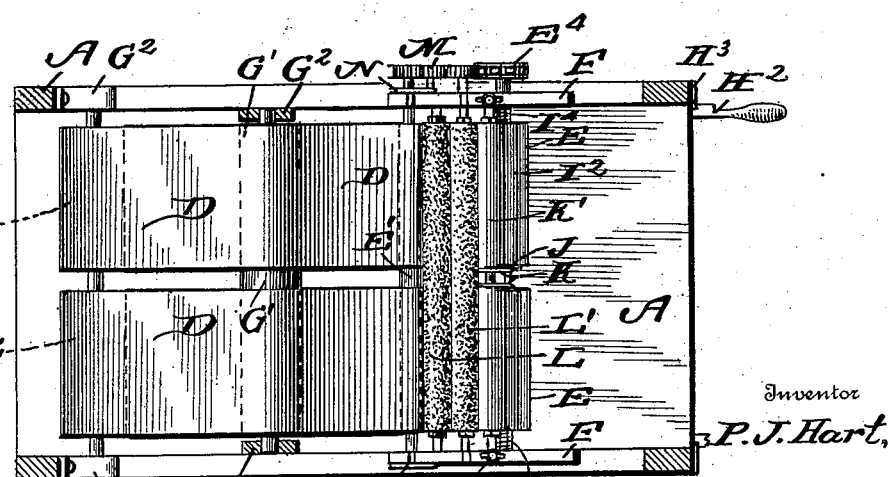

No. 711,963. Patented Oct. 28, 1902.
P. J. HART.
TOBACCO STEMMING AND BOOKING MACHINE.
(Application filed June 14, 1902.)
(No Model.) 3 Sheets—Sheet 3.

Witnesses

Inventor
P. J. Hart.
By
Attorneys

UNITED STATES PATENT OFFICE.

PATRICK J. HART, OF MENDOTA, ILLINOIS.

TOBACCO STEMMING AND BOOKING MACHINE.

SPECIFICATION forming part of Letters Patent No. 711,963, dated October 28, 1902.

Application filed June 14, 1902. Serial No. 111,681. (No model.)

*To all whom it may concern:*

Be it known that I, PATRICK J. HART, a citizen of the United States, residing at Mendota, in the county of Lasalle and State of Illinois, have invented a new and useful Tobacco Stemming and Booking Machine, of which the following is a specification.

My invention relates to an improved tobacco stemming and booking machine, and has for its main object to provide a cheap, simple, and highly-efficient machine for stripping or cutting the stem from the leaf of tobacco and then booking or laying each half of the leaves upon the leaves that have been previously cut and holding them in such position and also holding them smooth and flat until a sufficient quantity has been booked, when the books may be removed from the machine and delivered to the workman or stored away, or, if desired, they may be left in the machine, as circumstances may determine.

With these briefly-stated objects in view my invention comprises a frame in which is journaled a shaft carrying cylinders or drums over which run endless belts for a portion of the periphery of the drums, the remaining portions of the belts being held adjacent the drums and guided by a series of idlers. In front of the drums is arranged a frame carrying suitable feed-rollers and cutting-disks, through which the leaves are fed and cut prior to being taken up by the belts and drums, the said cutters being driven in the manner as will be clearly set forth later on.

A further object of my invention is to provide a suitable tension device for the belts; and a still further object is to provide an arrangement for operating the drums and belts, as will appear later on; and with these objects in view my invention also comprises certain details of construction and novelties of combination and arrangement of parts, as will be fully described in the following specification and pointed out in the claims, reference being had to the drawings, in which—

Figure 4:
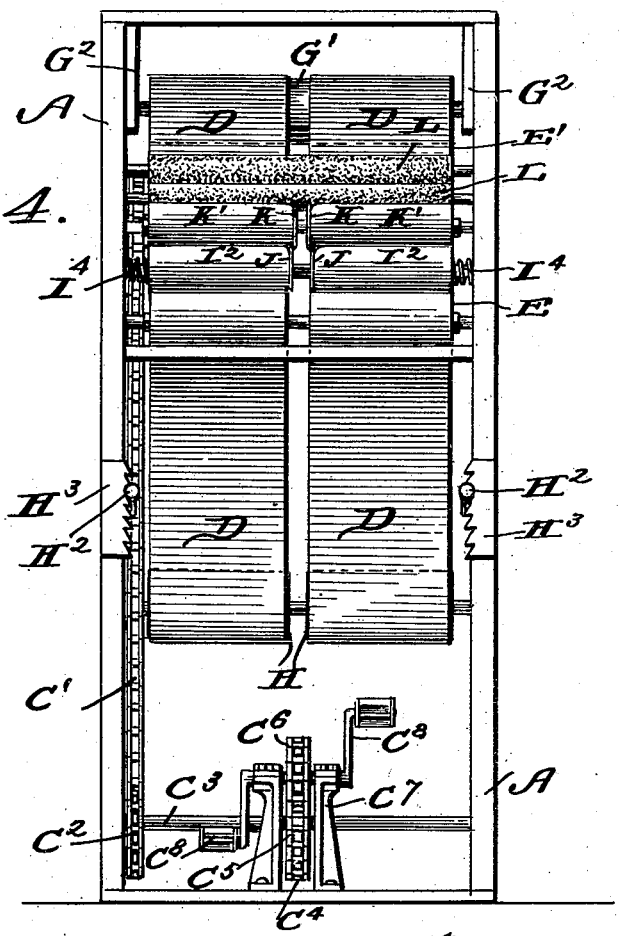
Figure 7:
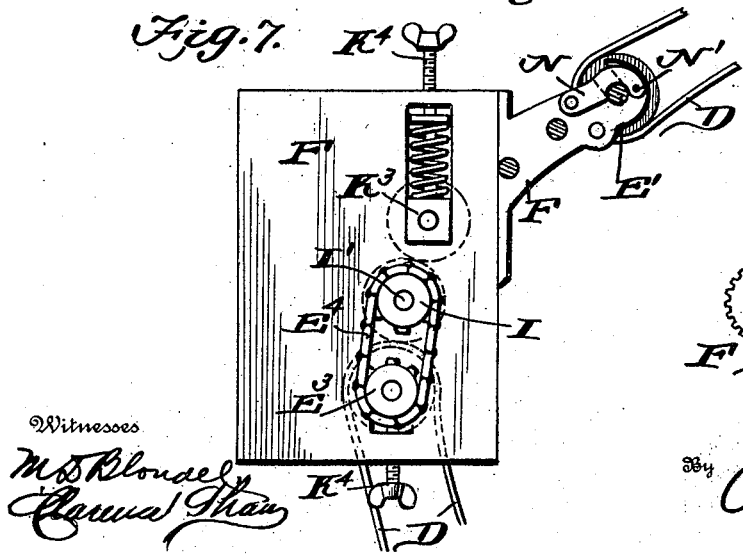

Figure 1 is a perspective view of my improved tobacco stemming and booking machine complete. Fig. 2 is a transverse section of the same, the section being taken on the line drawn between the drums. Fig. 3 is a plan view of the machine. Fig. 4 is a front view thereof. Fig. 5 is a detail side view of the bracket for supporting the cutters and feed-rollers. Fig. 6 is a sectional view taken through one end of the bracket and showing the rollers and cutters in position. Fig. 7 is a detail view of the opposite side of the bracket to that shown in Fig. 5, the ends of the shafts carrying the brushes being shown in section; and Fig. 8 is a detail side view of a portion of the bracket, illustrating the train of gears for operating the said brushes.

In carrying out my invention I employ a suitable frame A, in which is journaled a shaft A', upon which is mounted two drums B B, said shaft also having the sprocket-wheel C arranged upon one end thereof, over which runs a sprocket-chain C', that also passes around the sprocket-wheel $C^2$, carried by a shaft $C^3$, that is journaled in the lower end of the frame. The shaft $C^3$ also carries a sprocket-wheel $C^4$, that is connected, by means of a sprocket-chain $C^5$, with a drive-sprocket $C^6$, mounted in a bracket $C^7$, arranged within the frame in advance of the said shaft $C^3$, and which has its shaft provided with cranks and pedals $C^8$, as clearly shown. The drums B are arranged a slight distance apart for the purpose as will appear hereinafter, and over the greater portion of the periphery of each runs an endless belt D, which belts are preferably of the same width as the drums, said belts also passing around elongated pulleys E and E', which are journaled in a bracket F and in such position that a portion of the peripheries of the drums is exposed, the belts passing around guide pulleys or rollers G and G', movably held in brackets $G^2$ $G^2$, arranged upon the frame adjacent the drums B, and a suitable pulley H is also arranged adjacent the drum and preferably under the same, said pulley being held in the looped ends of spring-arms H', which have their opposite ends secured to levers $H^2$, which in turn are pivotally connected at one end to the frame and have their opposite ends or handle portion held in engagement with ratchet-plates $H^3$, arranged upon the front of the frame and in convenient reach of the operator, and it will be readily understood that by raising or lowering the levers a greater or less tension is applied to the belts and the latter regulated to accommodate the quantity of the leaves or thickness of the books carried between the said belts and the drums. By arranging the guide rollers or pulleys as described the belts pass around the drums for a certain distance, then up over the pulleys E and down under the tension-roller H, up over the guide rollers or pulleys G G', and finally around pulleys E' and back upon the drums to the first pulleys E.

The shaft of the pulleys E is preferably held in boxes $E^2$, which are adjustably held in the bracket F, and upon one end of the shaft is held a sprocket-wheel $E^3$, which through the medium of a chain $E^4$ imparts motion to a sprocket I, carried by a shaft I', upon which is held feed-rollers $I^2 I^2$, arranged upon opposite ends of the shaft, and their inner or abutting ends are arranged a slight distance apart and are provided with suitable disk cutting-blades J J, that are designed to coact with similar blades K K, carried upon the ends of a second set of feed-rollers K' K', securely held upon the ends of a shaft $K^2$, which is mounted in spring-actuated journal-boxes $K^3 K^3$, also carried by the brackets. Suitable tension-screws $K^4$ are provided for each box, so that the tension of the said rollers may be regulated, as clearly shown. I prefer to key the rollers $I^2$ upon the shaft I' and to allow a slight longitudinal movement of the rollers upon the shaft, so that each of the knives will be adjustably held in engagement with its respective coacting knife, and in order to provide a yielding contact of the blades I encircle the ends of the shaft I' with springs $I^4$ $I^4$, which bear against the outer ends of the rollers and the adjacent boxes, and it will thus be seen that I provide a yielding contact of the knife blades or disks by which all wear is constantly taken up, and by providing the spring-actuated box for the rollers K' leaves of various thicknesses may be readily passed through the feed-rollers.

Figure 8:
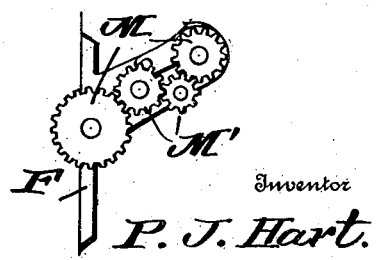

Brushes L and L' are mounted in the bracket F, one brush, L, being arranged for engagement with the face of the belts and the other brush, L', for engagement with the feed-rollers and knives, said brushes being driven in the direction indicated by the arrows through the medium of a train of gears and idlers M and M', respectively, as most clearly indicated in Fig. 8 of the drawings.

In practice I also propose to arrange the shaft of the rollers E' movable, so that the books of tobacco may be readily removed from between the belts and cylinders, and in order to accomplish that purpose I provide the journals of said shaft with openings, which are closed by suitable keys N, which are pivotally held upon the sides of the brackets and arranged to fold down over the shaft, as shown most clearly in Fig. 7, a suitable pin N' passing through the free end of the keys and into the bracket for positively locking the key in place.

In operation the attendant is seated in front of the machine in such position that the pedals may be operated with his feet, which through the medium of the sprocket wheels and chains impart motion to the drums and also to the belts, and through the medium of the sprocket wheels and chain carried by the shaft of one of the belt-pulleys motion is imparted to the feed-rollers and cutters, between which the leaf is passed by the operator, and after the leaf is carried through the rollers and the stem cut therefrom each half of the leaf is caught between the drums and belts and carried around thereby, the stem dropping to the floor between the said drums, and as soon as the cut leaf is seen by the operator under the belt at the point of the roller E' another leaf is inserted between the rollers and cutters, and by the time the previously-cut leaf reaches a point opposite the cutters the leaf being cut by the latter will register with the leaf carried by the drum and in consequence is laid upon the previously-cut leaves and carried around upon the cylinders or drums in a like manner. This operation is repeated until a certain quantity of leaves have been stemmed, when they are removed from the machine and stored away until wanted for use, and by arranging the brushes as described the leaves will be brushed from the belt should they have a tendency to adhere thereto. A brush contacting with the cutters and feed-rollers wil also guide the leaf and, further, keep the cutters perfectly clean at all times. During the operation of the cutting and booking the leaves the springs controlling the guide-roller H will hold the belt sufficiently taut to keep the same constantly drawn against the drums, and it will of course be understood that as the leaves are piled upon the cylinder beneath the belts the spring will yield sufficiently to allow the leaves to be piled one upon the other, a further object of the springs being to take up the slack in the belt, which is apt to stretch from constant use, and by making the levers adjustable the rollers may be moved to or from the drums and a greater or less tension applied to the belts. When it is desired to remove the books of tobacco from the machine, the keys holding the shaft of the roller E' in place are thrown back, when the roller and belts may be lifted. The drums are then revolved a slight distance, exposing the books, when they may be lifted and withdrawn from the machine.

It will thus be seen that I provide an exceedingly simple and effective machine for the above-specified purpose which can be manufactured at an exceedingly small cost, and thus placed within the reach of all.

Of course it will be understood that the machine may be run by suitable belting by any other than manual power, if desired.

Having thus fully described my invention, what I claim as new, and desire to secure by Letters Patent of the United States, is—

1. In a tobacco stemming and booking machine, the combination of a frame, drums mounted therein and spaced apart, movable guide-rollers held adjacent the drums, endless belts operating upon the drums and adapted to drop the stem between the drums and guide-rollers, feed-rollers carrying the cutters arranged adjacent to the drums, a tension device for the belts, and means for operating said drums, belts, feed-rollers and cutters, substantially as and for the purpose set forth.

2. In a tobacco stemming and booking machine, the combination of a frame, a shaft journaled therein, drums mounted upon the said shaft, guide-rollers movably held adjacent the drum, levers pivoted to the frame, spring-arms connected to the levers, rollers carried by the said spring-arms, endless belts operating upon the said drums and rollers, a bracket carried by the frame, feed-rollers carrying cutting-disks mounted in the brackets, brushes carried by the bracket, one of which is held for engagement with the belts and the other being arranged for engagement with the feed-rollers and cutters upon one of the shafts, and means for operating the said brushes, rollers, belts and drums, substantially as and for the purpose described.

3. In a tobacco stemming and booking machine, the combination of a frame, a shaft journaled therein, drums mounted upon the said shaft, slotted brackets arranged upon the frame, guide-rollers movably held in the said brackets, a tension-pulley arranged adjacent the drums, endless belts operating upon the drums and guide-rollers, feeding-rollers arranged adjacent the drums, cutting-disks carried by the adjacent ends of the feed-rollers, one set of disks and rollers being movable upon its shaft, springs carried by the said shaft for holding the said cutters into engagement with its coacting cutter, brushes arranged adjacent the drums and adapted for engagement with the belts and one set of rollers, and means for operating the said drums, rollers, belts, feed-rollers and cutters, substantially as and for the purpose set forth.

4. In a tobacco stemming and booking machine, the combination of a frame, a shaft journaled therein, drums mounted upon the said shaft, guide-rollers mounted in the frame adjacent the said drums, movable guide-rollers carried by the frame, a tension-roller arranged within the frame beneath the drum, spring-arms supporting said tension-roller and levers connected to the free ends of said spring-arms, endless belts operating upon the said drums, guide-rollers and tension-rollers, the said belt being arranged to travel over the greater portion of the surface of the said drums, and thus leaving a portion of the surface of the drums exposed, feed-rollers carrying cutters arranged in the frame adjacent the exposed surface of the drums, and means for operating the said drums, rollers, and belts, substantially as and for the purpose specified.

5. In a tobacco stemming and booking machine, the combination of a frame, a shaft journaled therein, drums mounted upon the said shaft, a sprocket-wheel mounted upon one end of the said shaft, a second shaft journaled in the lower end of the frame, sprocket-wheels carried by the said shaft, a bracket arranged in the frame in advance of the second-named shaft, a shaft carrying cranks and pedals journaled in the said bracket, a drive-sprocket arranged upon the shaft, a belt connecting the said drive-sprocket with the sprocket of the lower shaft, and a belt connecting the remaining sprocket with the sprocket-wheel upon the drum-shaft, a bracket arranged in the frame, shafts carrying feed-rollers and cutting-blades journaled in the bracket, guide-rollers movably held in the frame adjacent the drums, levers carrying tension-rollers arranged in the frame, endless belts operating upon the drums and rollers, brushes arranged in the bracket, one of which being adapted for engagement with the belts of the other brush for engagement with one set of feed-rollers and cutting-disks, and means for operating the drums, belts, rollers and cutters, substantially as shown and described.

6. In a tobacco stemming and booking machine, the combination of a frame, a shaft journaled therein, drums mounted upon the shaft, a bracket arranged in the frame adjacent the drums, feed-rollers carrying cutter-disks mounted in the brackets, one of said feed-rollers being held in yielding journal-boxes, screws for controlling the movement of said boxes, guide-rollers mounted in the bracket, movable rollers held in the frame adjacent the drums, levers carrying spring-actuated rollers pivotally held to the frame, endless belts operating upon the said drums and rollers, ratchet-blades carried by the frame and adapted for engagement by the said levers, a sprocket-wheel arranged upon the shaft of one of the feed-rollers, and a sprocket arranged upon the shaft of the adjacent guide-roller, a chain connecting said sprockets, brushes arranged in the bracket, the shafts of said brushes being provided with gear-wheels, a gear arranged upon the shaft of the guide-rollers adjacent the brushes, idlers carried by the bracket and arranged for engagement with the gears upon brush, and roller-shafts, and means for operating the said drums, belts, rollers, cutters, and brushes, substantially as and for the purpose specified.

7. In a tobacco-stemming machine, the combination of a frame, a shaft journaled therein, drums mounted upon the shaft, a bracket arranged in the frame, guide-rollers mounted in the brackets, one of said rollers being held in a slotted bearing, keys arranged upon the bracket for closing the said slots in the bracket, rollers movably held in the frame adjacent the said drums, endless belts operating upon the said drums and rollers, shafts journaled in the bracket adjacent the drums, feed-rollers carrying cutting-disks arranged upon one of the shafts, feed-rollers carrying cutting-disks arranged upon the opposite shaft, said rollers and cutters of the last-named shaft having a lateral movement thereon, springs arranged upon the shaft and adapted for engagement with the laterally-movable rollers, and means for operating the said drums whereby motion is imparted to the said belts, rollers and cutters, substantially as and for the purpose specified.

PATRICK J. HART.

Witnesses:
GEORGE ANSTETH,
A. H. McINTIRE.